G. KAPP.
PHASE ADVANCER FOR DYNAMO ELECTRIC MACHINES.
APPLICATION FILED DEC. 31, 1915.
1,258,577.
Patented Mar. 5, 1918.
2 SHEETS—SHEET 1.
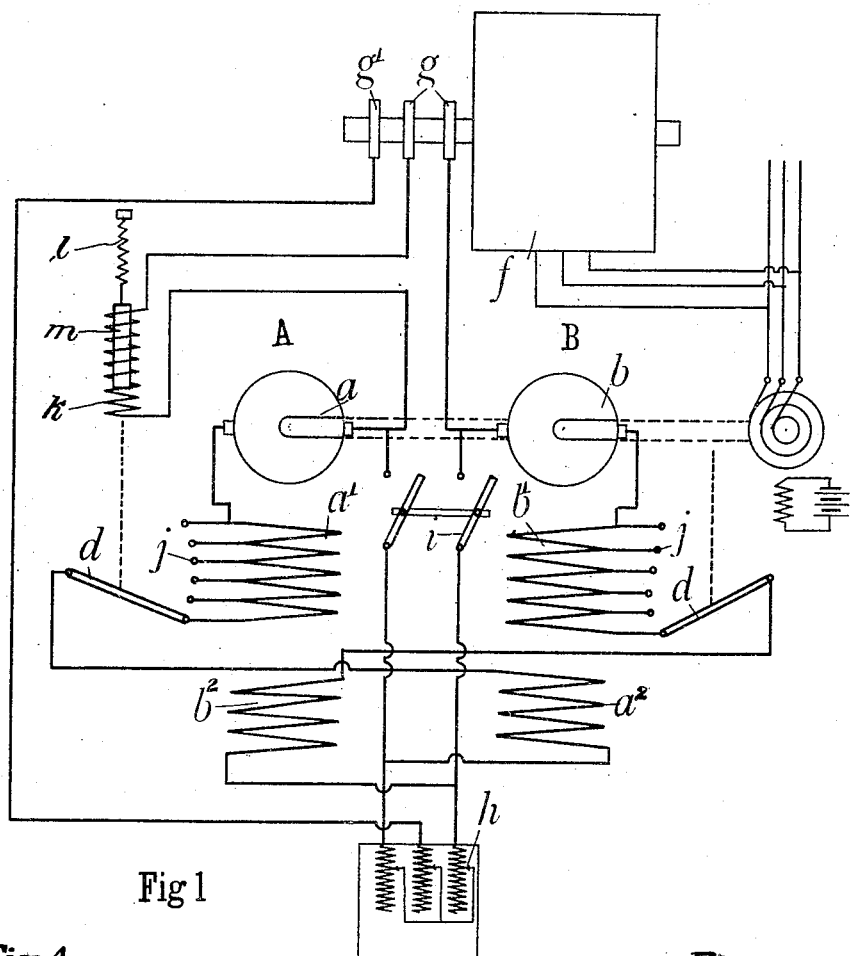
Fig 1
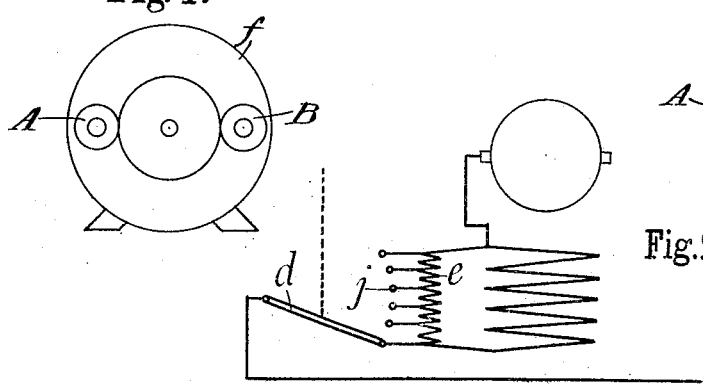
Fig. 4.
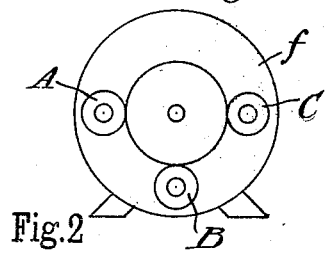
Fig. 5.
Fig. 2.
INVENTOR
Gisbert Kapp
BY
ATTORNEYS G. KAPP.
PHASE ADVANCER FOR DYNAMO ELECTRIC MACHINES.
APPLICATION FILED DEC. 31, 1915.

1,258,577.

Patented Mar. 5, 1918.

INVENTOR
Gisbert Kapp
BY
ATTORNEYS

UNITED STATES PATENT OFFICE.

GISBERT KAPP, OF BIRMINGHAM, ENGLAND.

PHASE-ADVANCER FOR DYNAMO-ELECTRIC MACHINES.

1,258,577.  Specification of Letters Patent.  Patented Mar. 5, 1918.

Application filed December 31, 1915. Serial No. 69,611.

*To all whom it may concern:*

Be it known that I, GISBERT KAPP, D. Eng., subject of the King of Great Britain, residing at the University of Birmingham, England, have invented certain new and useful Improvements Relating to Phase-Advancers for Dynamo-Electric Machines, of which the following is a specification.

This invention relates to phase advancers of the rotary type for use with asynchronous, or induction motors.

The object of the invention is to provide an improved phase advancer adapted for use, more especially, with rolling-mill and other like motors which are designed to slow down under load sufficiently to permit energy to be obtained from a flywheel. In such motors the difference between full and reduced speed is considerable, and consequently the slip which under light load is small is relatively large under heavy load. Hitherto the variation of slip between wide limits (*e. g.*, between 2% and 20% of the synchronous speed) has been obtained by the use of a slip regulator which inserts more or less resistance in the rotor circuit. This method of slip regulation is wasteful as the power absorbed in the added resistance is lost. Further, the use with such motors of the usual phase advancers does not reduce this loss and it does not materially increase the difference between the slip at light and heavy load. With my improved phase advancer, no additional external resistance for producing a large slip is required and a large part of the power which with other regulating devices is wasted, can be returned either to the motor as mechanical power or to the circuit as electrical power.

The invention comprises the employment with each of the secondary phases, of a dynamo machine the field of which is produced as hereinafter described by current passing through separate field windings from each of the secondary phases, and the armature of which is in series with one of the secondary phases and the corresponding field winding.

The invention also comprises the provision of means whereby the excitation produced by the winding which is in series with the armature can be increased for increased motor load and slip and decreased for decreased motor load and slip.

The invention further comprises the use of any suitable automatic apparatus which makes the aforesaid field controlling means dependent on the condition of the secondary circuit.

Referring to the two accompanying sheets of explanatory drawings:—

Figure 1 is a diagram showing the application of the invention to a two-phase induction motor, and Fig. 2 shows an alternative method of regulating one of the field windings.

Fig. 4 illustrates diagrammatically one way of mechanically connecting a phase advancer to a two-phase motor, and Fig. 5 is a similar view showing one way of mechanically connecting a phase advancer to a three-phase motor.

The same reference letters in the different views indicate the same or similar parts.

Figure 3:
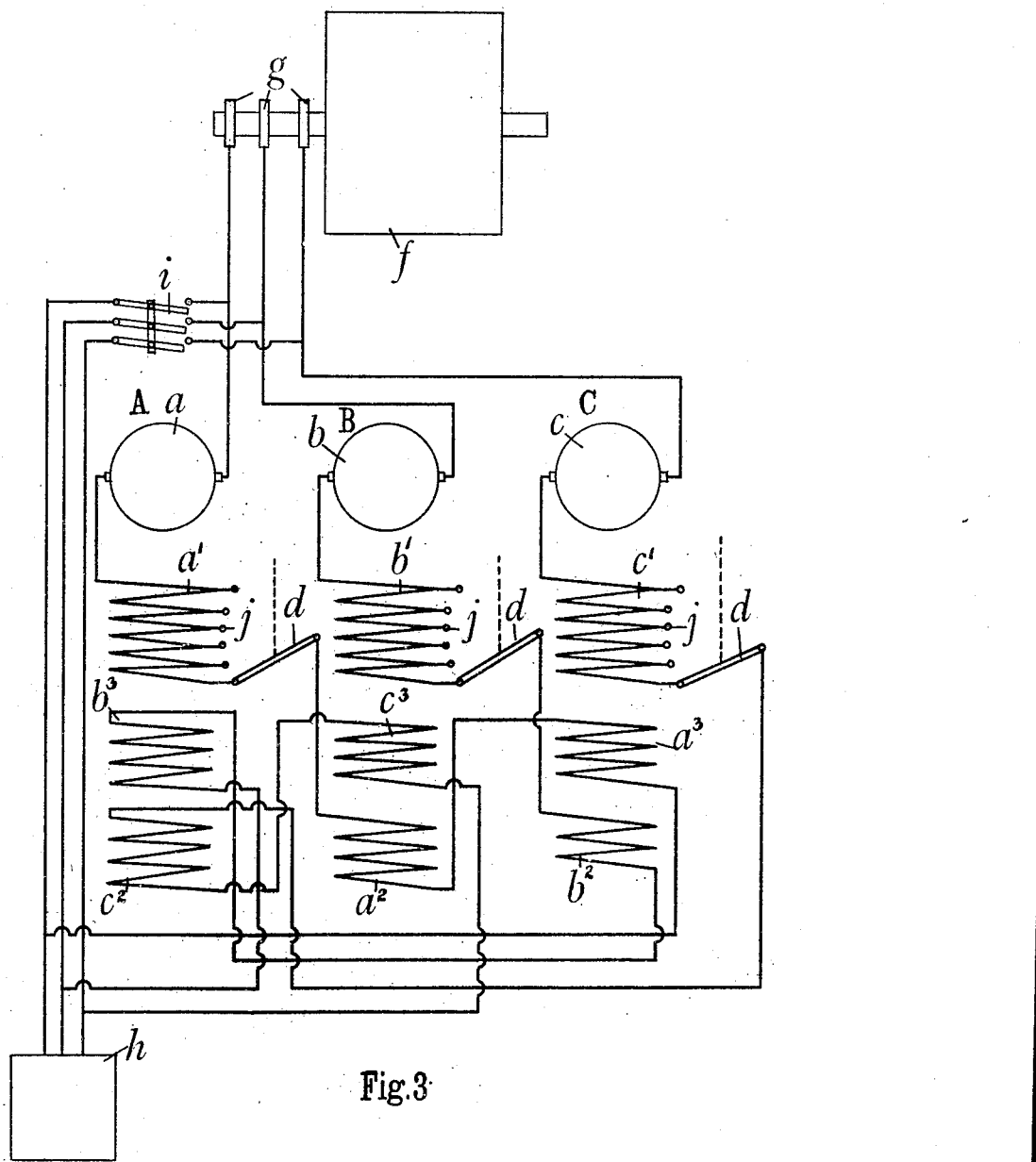
Fig. 3 is a diagram showing the application of the invention to a three-phase motor.

In the application of the invention to a two-phase induction motor as shown in Fig. 1, two dynamo-electric machines are employed, and a pair of field windings are provided for each machine. Designating the rotor secondary phases and the corresponding machines as A and B, current is taken from phase A through the armature $a$ of machine A, its compensating winding and commutating winding if any, and through one of the field windings $a'$, the said winding $a'$ and the armature $a$ being coupled in series and in such a manner that the machine operates as a motor. Current from phase B is passed through the other winding $b^2$, in such a manner that the machine when rotated by current from the A phase injects an E. M. F. which has a component leading by 90° over the current in the A phase. The magnitude of this E. M. F. depends on the excitation produced by the two phases jointly and that of the leading component on the excitation produced by phase B in the field of the machine A and vice versa. The vectorial sum of E. M. F. required to overcome resistance and other losses and the total counter E. M. F. of the machine is balanced by the slip E. M. F. The total E. M. F. induced in the machine as well as its wattless leading component can be determined from the dimensions, winding data and speed in the usual manner well known to any designer of dynamo-electric machines. When the phase advancing machines are geared to the main motor, as shown diagrammatically in Fig. 4, their speed is that of the main motor and therefore decreases with an increase of slip; when they are used for driving a synchronous alternator (substantially as illustrated in Fig. 1 which actually shows a three phase arrangement) returning power to the supply circuit their speed is constant and is determined by the frequency of this circuit and the number of poles of the generator. The field winding $a'$ in the A phase may either have tappings brought out to contacts $j$ over which a switch arm $d$ operates as shown in Fig. 1, or it may be permanently shunted by an inductionless resistance $e$ which is provided with tappings connected to contacts $j$ and a movable switch arm $d$, as shown in Fig. 2, the object in either case being to vary the exciting force produced by the field winding of phase A, and consequently the magnitude and phase angle of the E. M. F. injected by the machine. When the load is heavy the switch is in such a position that all or most of the coils of the A exciting winding $a'$ are in circuit, or most or all of the resistance $e$ is in circuit, so that the said winding produces a strong excitation and the power absorbed by the machine electrically is relatively large. At the same time its counter E. M. F. is large, causing a large slip in the main motor. When the load is light the switch cuts out some or all of the coils of the field winding $a$ in phase A or deflects more or less of the current through the shunt resistance $e$. The counter E. M. F. is then reduced and its phase angle approaches or reaches 90° lead to the A current. Consequently when the motor gives out little or no power the slip is correspondingly reduced.

The switch may be under the control of a solenoid and spring or equivalent device actuated by the current from the rotor of the motor $f$ with which the machine is arranged. Such a device is shown at Fig. 1 where $k$ indicates the solenoid coil and $l$ the spring, the core $m$ being connected to the arm $d$.

In the machine B, the armature $b$ and other associated parts including the field winding $b'$ are traversed by the rotor current from phase B, and the second field winding $a^2$ is traversed by rotor current from phase A, the arrangement and operation being the same as in machine A. Both machines are mechanically connected to the rotor of the main motor which they assist. Or they are coupled to a synchronous generator $n$ which delivers current into the supply circuit; by suitably adjusting the excitation of the generator the current which it delivers may be caused to have a leading component, so that not only does the phase advancer improve the power factor of the main motor, but it also improves the power factor of the supply system and compensates for low power factor due to other motors connected to the same system.

The application of the invention as shown in Fig. 3 to a three-phase motor is substantially similar to that above described. Current from the A phase of the rotor is passed through the armature $a$ of machine A, its compensating and commutating windings, and the field winding $a'$, in such a sense that the machine operates as a motor. This field winding is regulated as already described in connection with the two phase machine. The currents from the B and C phases are passed separately through two other field windings $b^3$ and $c^2$ in such a sense that when the motor is running the field produced by the B and C windings together induces an E. M. F. which has a component leading over the current in the A phase by 90°. The total E. M. F. induced in the armature $a$ is due to a flux produced jointly by the exciting coils $a'$, $b^3$ and $c^2$. The leading component is dependent on the excitation contributed by the coils $b^3$ and $c^2$ and its value relative to that of the total induced E. M. F. and therefore also of the slip E. M. F. may be adjusted by a suitable choice of the number of turns in the different coils. If, for instance, the number of active turns chosen is the same in all three coils the watt component amounts to cos. $60°=0.5$; and the leading wattless component to sin. $60°=0.86$ of the total induced E. M. F. By selecting other proportions the relative values of total induced E. M. F. and its two components can be suitably adjusted as will be easily understood by engineers accustomed to dealing with the design of polyphase machinery. The other two machines are wound and connected up in a similar manner. Thus, in machine B current from B phase passes through the armature $b$ winding $b'$, while current from the A and C phases passes through the separate windings $a^2$ and $c^3$. Similarly in machine C, current from the C phase passes through the armature $c$ and winding $c'$, and current from the phases A and B passes through the separate windings $a^3$ and $b^2$. The three machines may be coupled or geared mechanically to the motor, as shown in Fig. 5, or they may be coupled to a synchronous generator $n$ as shown in Fig. 1.

The phase advancer is inserted between the slip rings $g$ of the motor $f$ and its starter $h$, which may be of the usual construction. A switch $i$ may be provided for short-circuiting the phase advancer during starting of the motor. When the motor is provided on the primary side with a reversing switch for changing the direction of rotation, a similar switch must be provided in the connections between the slip rings and the phase advancer and the two switches are preferably interlocked. In the two phase arrangement one end of the rotor coils is connected to one of the slip rings and one end of the other coil to the other slip ring, the other two ends of the coils being connected together and to a third slip ring $g'$ which is connected to a middle point on the starter.

I wish it to be understood that my invention is not limited to the use of external means for varying the excitation of the windings which are in series with the armatures. I use such means in cases where it is required to maintain a definite relation, such for instance as exact proportionality, between the torque of the main motor and its slip. The position of the switch lever determines the exciting force of the series coils $a'$, $b'$, $c'$, and therefore the magnitude of the counter E. M. F. of the machines A B C acting as motors. This counter E. M. F. determines the slip and in this manner a definite relation between the slip and the torque may be provided for. In some cases it is not essential to provide any definite relation between the slip and torque; it suffices that an increase in resisting torque experienced by the motor should call forth an increase of slip, although this need not be exactly proportional. This requirement for an approximate slip regulation can be fulfilled by omitting the solenoid and other movable apparatus altogether and setting the lever $d$ into a position corresponding with the character of the work the main motor has to do. Thus, in the case of a rolling mill motor, if light sections have to be rolled, it suffices to provide for a smaller slip at the end of a pass and the levers $d$ are set to one of the upper contacts of the coils $a'$, $b'$, $c'$, thereby permanently reducing the exciting force of these coils. If heavy sections have to be rolled the levers are set on the lowest contacts, thereby giving these coils maximum exciting force. In either case, the machines A B C acting as series exciting motors develop and inject into the rotor circuits a counter E. M. F. which is approximately proportional to the current thus increasing the slip at heavy load and decreasing it at light load. In this way a rough kind of slip regulation is obtained without the use of auxiliary apparatus. In cases where the motor is mainly used for one class of work, for instance, the rolling of the same section, or the driving of a winding engine, I may also omit the tappings $j$ and switch levers $d$ and make permanent connection between the coils $a'$, $a^2$, $b'$, $b^2$ and $c'$, $c^2$.

The invention is not limited to any particular constructional details, nor to the means herein described for regulating or controlling the phase advancer when such are employed, as these may be varied to meet different requirements.

Having thus described my invention what I claim as new and desire to secure by Letters Patent is:—

1. In a phase advancing system for asynchronous or induction motors, the combination with a polyphase secondary winding of a motor, of a plurality of dynamo-electric machines each provided with field windings corresponding in number to and connected to receive current from the several phases of the secondary winding, and an armature connected in series with one of the said phases and the corresponding field winding, substantially as described.

2. In a phase advancing system for asynchronous or induction motors, the combination with a polyphase secondary winding of a motor, of a plurality of dynamo-electric machines each provided with field windings corresponding in number to and connected to receive current from the several phases of the secondary winding, an armature connected in series with one of the said phases and the corresponding field winding, and means whereby the excitation of the winding of each machine which is in series with the armature can be varied, substantially as described.

3. In a phase advancing system for asynchronous or induction motors, the combination with a polyphase secondary winding of a motor, of a plurality of dynamo-electric machines each provided with field windings corresponding in number to and connected to receive current from the several phases of the secondary winding, an armature connected in series with one of the said phases and the corresponding field winding, means whereby the excitation of the winding of each machine which is in series with the armature can be varied, a short-circuiting switch, and a starter, substantially as described.

In testimony whereof I have signed my name to this specification.

GISBERT KAPP.

Copies of this patent may be obtained for five cents each, by addressing the "Commissioner of Patents, Washington, D. C."